United States Patent [19]

Brekke

[11] Patent Number: 4,598,581

[45] Date of Patent: Jul. 8, 1986

[54] QUICK CONNECT DIAGNOSTIC SYSTEM

[75] Inventor: Carroll E. Brekke, San Jose, Calif.

[73] Assignee: FMC Corporation, Chicago, Ill.

[21] Appl. No.: 623,879

[22] Filed: Jun. 25, 1984

[51] Int. Cl.$^4$ .................................. G01M 15/00
[52] U.S. Cl. ..................... 73/117.3; 73/756; 374/145
[58] Field of Search .............. 73/117.2, 117.3, 115, 73/168, 116, 119 R, 714, 756, 708, 753, 863.41, 119 A, 118; 137/557, 552; 251/149.6, 149.1; 374/144, 145

[56] References Cited

U.S. PATENT DOCUMENTS

| 2,657,563 | 11/1953 | Burchett | 135/557 |
| 2,919,935 | 1/1960 | Nyberg | 251/149.6 |
| 3,102,427 | 9/1963 | Trostel | 73/756 |
| 3,273,384 | 9/1966 | Flaugher | 73/118 |
| 3,387,621 | 6/1968 | Schaff | 251/149.6 |
| 3,523,701 | 8/1970 | Graham | 285/150 |
| 3,560,027 | 2/1971 | Graham | 285/150 |
| 3,705,535 | 12/1972 | Cohen et al. | 73/753 |
| 3,943,760 | 3/1976 | Allen | 73/756 |
| 4,069,712 | 1/1978 | Armstrong et al. | 73/118 |
| 4,114,853 | 9/1978 | Medvick | 251/149.6 |
| 4,239,184 | 12/1980 | Dudar | 251/149.6 |
| 4,285,238 | 8/1981 | Wilson | 374/144 |

OTHER PUBLICATIONS

The American Heritage Dictionary, 1982, Second College Edition, Houghton Mifflin Company, p. 516.

An unidentified page from a brochure illustrating quick disconnect couplings.

Primary Examiner—Jerry W. Myracle
Assistant Examiner—Robert R. Raevis
Attorney, Agent, or Firm—A. J. Moore; H. M. Stanley; R. B. Megley

[57] ABSTRACT

A quick connect diagnostic system is disclosed for detecting the pressure and temperature of fluid streams flowing in fluid flow passages in engines or the like. A plurality of female portions of the quick connect mechanisms, which include foot valves, are permanently connected to different fluid flow passages in the engine. During normal operation of the engine dust caps are locked in the female portions and include at least one O-ring seal to cooperate with the foot valve to assist in preventing leakage. When testing for temperature or pressure of the fluids, temperature probes or pressure probes with transducers thereon, are inserted into the associated female portions causing O-ring seals to seal the quick connect coupling prior to contacting and opening the foot valves which subject the pressure probes to the fluid pressure in the associated passages, and which project the ends of the temperature probes into the flow streams being tested. The transducers are connected to a test meter which provides accurate readouts for the pressures and temperature in the several passages being tested. Several embodiments of quick connect coupling are disclosed for use alone as a subcombination, or for use in the system.

13 Claims, 13 Drawing Figures

FIG_1

FIG_6

FIG_7

FIG_8

FIG_9

QUICK CONNECT DIAGNOSTIC SYSTEM

BACKGROUND OF THE INVENTION

1. Field of the Invention

The present invention relates to diagnostic systems and methods, and more particularly relates to quick connect and disconnect mechanisms as a subcombination and the use of such mechanisms in a diagnostic system for determining the temperature and pressure of fluids at a plurality of locations in flow streams such as coolant, oil and vapors which flow through passages in engines, pipelines, or the like.

2. Description of the Prior Art

Diagnostic systems for determining the temperature and pressure of fluids in flow streams such as flow passages of engines used in military vehicles or the like typically require that pipe plugs be removed before temperature or pressure probes can be inserted into the flow streams. In most instances the flow passages must be partially or totally drained before the probes can be inserted. Certain diagnostic systems for engines are known which have temperature and pressure probes with their associated transducers permanently positioned in the fluid streams in their flow passages. However, vibration and shock resulting from the vehicles being driven over rough ground damage the transducers thus requiring frequent replacement of the associated probes.

SUMMARY OF THE INVENTION

In accordance with the present invention a quick connect diagnostic system is disclosed for determining the temperature and/or pressure at a plurality of locations in fluid flow streams. Although the system may be used to provide data in other flow streams, the system is preferably used to periodically test the temperature and/or pressure of coolant, oil, hydraulic fluid and vaporized fuel, or the like used in internal combustion engines, which engines also includes standard temperature and pressure gauges. In a preferred embodiment, a plurality of quick connect mechanisms have their valved self sealing female portions screwed into the engine flow passages at predetermined locations. Dust caps are normally coupled with the female portions of the quick connect mechanisms to provide at least a secondary seal to prevent fluid leakage through the quick connect mechanisms.

Preferably, when preparing to test the temperature at a plurality of the quick connect locations, an electrical cable is disconnected from its stowed position on the dust cap of the female portion of a first quick connect mechanism and is thereafter removed from the female portion. The cable is then connected to a temperature probe and the temperature probe is locked in the female portion of the quick connect mechanism. The other end of the cable, as well as other cables associated with other ones of the quick connect mechanisms, are connected to a junction box secured to the engine, which junction box is connected to a vehicle test meter by a single transducer cable. The meter then provides a temperature reading for the particular flow passage being tested. The above procedure is then sequentially performed using the same temperature probe, at each of the other quick connect areas at which temperature reading are to be taken. A similar procedure is followed with the single pressure probe which probe is used to sequentially test the pressure at the quick connect locations at which pressure data is required.

If desired, the system may be used as above described except that separate multiple temperature probes or multiple pressure probes may be connected to associated ones of the cables and to associated ones of female portions of the quick connect mechanisms at which temperature or pressure is to be checked. The meter includes switches which will enable the operator to get independent temperature readings from each of the different locations being tested, and independent pressure readings from the locations in which pressure is to be tested.

Although the preferred methods of operating the quick connect diagnostic system is as indicated above, it will be understood that the junction box may be omitted and that an elongated transducer cable may be used to connect each temperature probe or pressure probe in turn directly to the meter, and subsequently to the quick connect devices at the locations at which temperature and pressure readings are to be taken.

The specific features of each of the several embodiments of the quick connect mechanisms permit connection and disconnection of the associated probes and dust caps from the associated female portions of the mechanism without loss of fluid from the flow passages being tested, and for providing at least a second fluid seal. The dust caps will, under normal circumstances, be connected to the female portions of the associated quick connect mechanisms in excess of about 99 percent of the time the engine is operating, thereby minimizing vibration and damage to the transducers connected only about 1 percent of the time, thus prolonging their life.

DESCRIPTION OF THE PREFERRED EMBODIMENT

The quick connect diagnostic system 20 (FIG. 1) of the present invention is diagrammatically illustrated with a gasoline or diesel engine 22 for testing the temperature and pressure of fluid in flow passages (not shown) such as coolant, oil, and vaporized fuel which flow through passages within the engine or its accessories.

Figure 1:
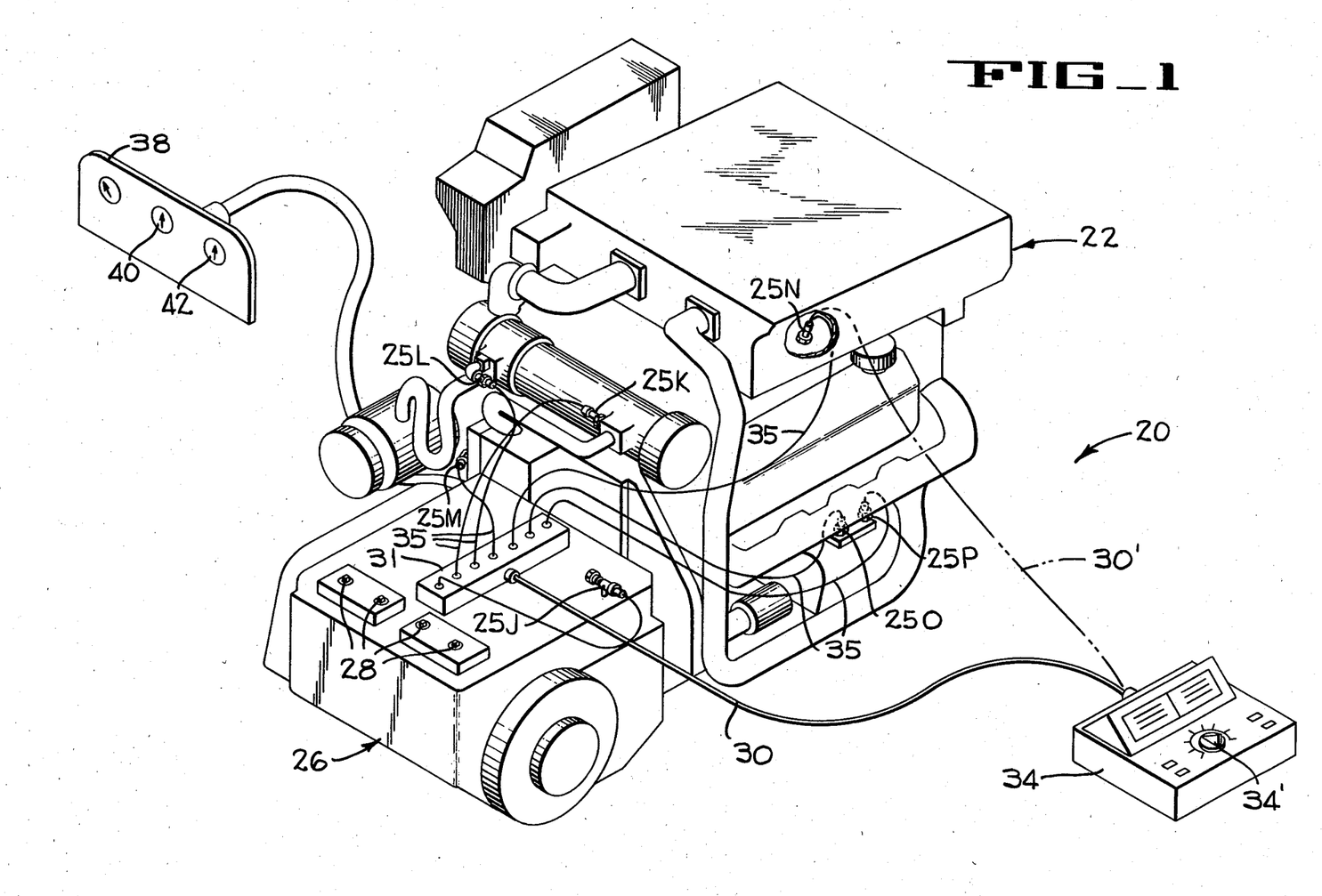
FIG. 1 is a diagrammatic perspective of an engine with the diagnostic system of the present invention illustrating seven quick connect temperature or pressure mechanisms in the engine connected to a portable vehicle test meter, and further illustrating a conventional instrument panel with temperature and pressure gauges thereon.

In FIG. 1, the quick connect mechanisms are generally identified by numerals 25 and are connected to the engine 22 at seven separate locations 25J-25P. The mechanism 25J is located in the oil flow stream of the hydraulic transmission 26 and is used for checking pressure. Coolant temperature is taken by the mechanism 25L. Vaporized diesel fuel pressure is taken at 25M. The temperature of the circulating transmission oil is taken at 25K. The intake manifold pressure is taken after turbo charged at 25N. The engine oil pressure is taken at 25O and the engine oil temperature is taken at 25P. The above seven quick connect mechanisms 25 have portions thereof that are permanently mounted on the engine 22 or its accessories when the engine is in the vehicle (not shown). If the engine 22 is to be removed from the vehicle for a major overhaul or the like, additional quick connect mechanisms 25 may be screwed into existing ports in the engine after first removing pipe plugs such as the plugs 28 illustrated in the transmission.

Figure 5:
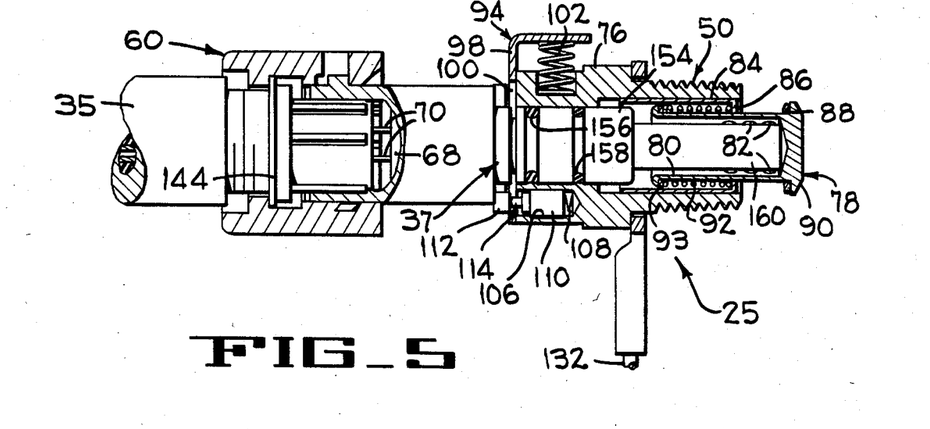
FIG. 5 is a side elevation with parts cut away and other parts shown in section, and with a temperature probe fully opening the foot valve with the electrical cable connected to a small temperature probe transducer.

When testing the temperature or pressure of the fluid in the several engine flow passages, each quick connect mechanism 25 is preferably used sequentially. As will be described below, a single temperature sensing probe is preferably used sequentially in all of the associated quick connect mechanisms 25 where it is desired to check the temperature of the fluid. Similiarly a single pressure sensing probe is preferably used to sequentially test the pressure of the fluids at the locations where pressure is to be taken. When testing for temperature and pressure, a transducer cable 30 is connected between a commercially available electrical junction box 31 and a commercially available portable vehicle test meter 34 which is placed in the vehicle's cab when the engine to be tested is in the vehicle. Individual quick connect electrical cables 35 are connected between the junction box 31 and pressure probes 36 (FIG. 4); and the junction box 31 and the temperature probes 37 (FIG. 5). The transducer cable 30 and vehicle test meter 34 are commercially available and are included in a U.S. Army Military Kit identified as the STE/ICE System which is capable of registering pressure and temperature indicia as well as many other types of test data required during the diagnostic testing of a vehicle.

As diagrammatically illustrated in FIG. 1, a standard instrument panel 38 is provided and includes the usual and conventional instruments and gauges to indicate to the operator whether or not the engine is operating within the acceptable ranges such as temperature gauge 40 and a pressure gauge 42.

Although the preferred mode of operation is to use one pressure probe 36 (FIG. 4) and one temperature probe 37 (FIG. 5) sequentially at the several locations where pressure readings and temperature readings are to be taken as above described, it is within the scope of the invention to use other modes of operation.

A second mode of operation of the diagnostic system 20 is to connect separate pressure probes to each quick connect mechanism 25 where pressure is to be taken and to sequentially transmit signals from each pressure probe through the associated cable 35, junction box 31 and transducer cable 30 into the meter 34 which provides a readout for the operator. A selector switch such as switch 34' in the meter 34 may be rotated to different locations to close electrical circuits to each pressure probe in turn. A similar procedure may be followed when separate temperature probes 37 are inserted into all quick connect mechanisms where temperature readings are desired.

A third mode of operation of the diagnostic system is to use an elongated transducer cable 30', indicated in phantom lines in FIG. 1, and connect the cable to a pressure probe. The pressure probe is then sequentially inserted into the several quick connect mechanisms 25 at which pressure data is to be taken and this data is read off the vehicle test meter 34 thereby by-passing the junction box 31. By using a single probe and its transducer, calibration errors which may occur if several transducers were used, is eliminated. A similar procedure would be used when sequentially taking temperature readings from the several quick disconnect temperature locations. This third mode of operation is ideally suited for testing the engine when the engine is removed from the vehicle and is supported and operated while on a test stand.

Several embodiments of the quick connect mechanism 25 usable in the diagnostic system 20 of the present invention will now be described.

Figures 2, 3, 4:
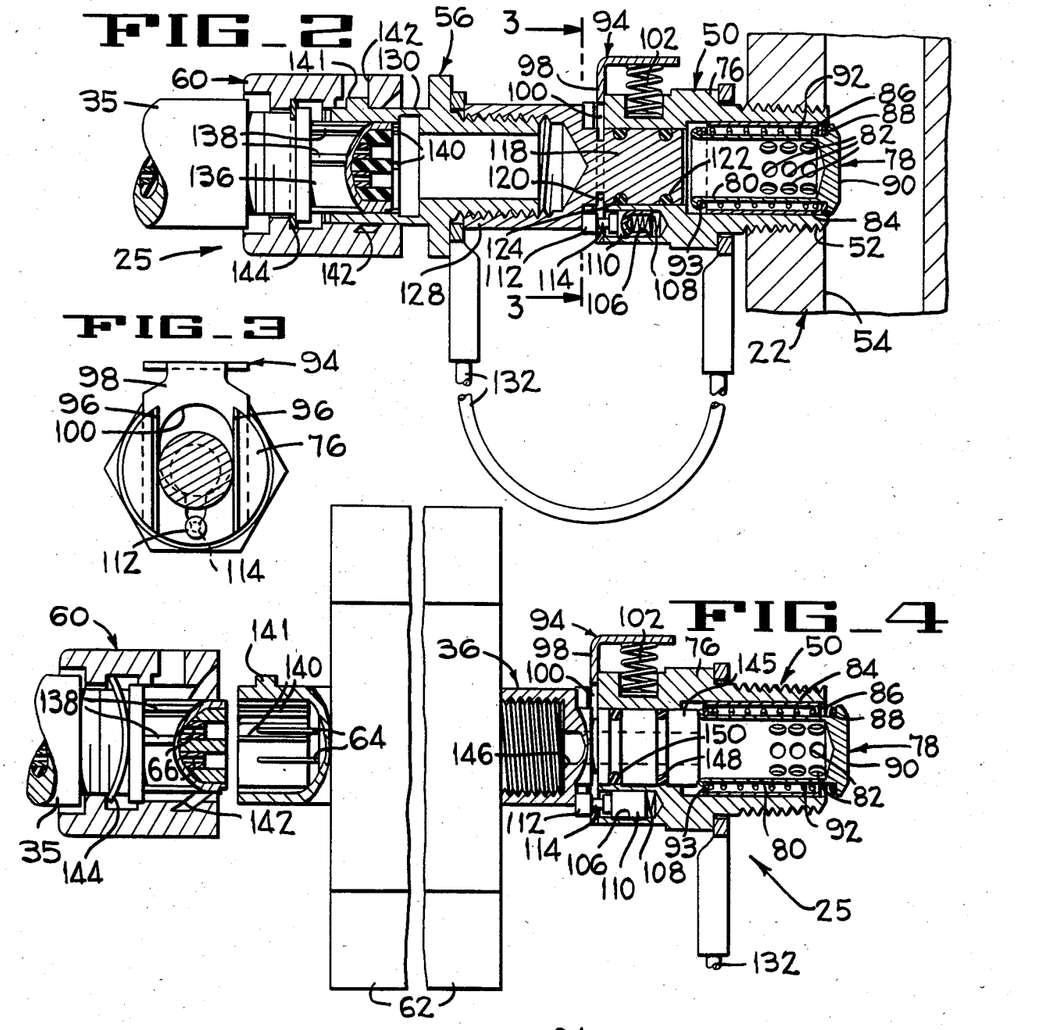
FIG. 2 is a central section of a first embodiment of a universal quick disconnect mechanism, said mechanism being used in the diagnostic system of FIG. 1 with a dust cap having an electrical cable connected thereto.
FIG. 3 is a section taken along lines 3—3 of FIG. 2 and illustrates a latching mechanism in closed position.
FIG. 4 is a side elevation with parts cut away of the quick connect mechanism of FIG. 2 but with a pressure probe connected thereto and partially opening the foot valve and with an electric cable connected to a large pressure probe transducer.

The details of the preferred embodiment of the quick connect mechanism 25 are illustrated in FIGS. 2-5. As will be made apparent below, the mechanism 25 of the first embodiment is a mechanism capable of receiving either the pressure probe 36 or the temperature probe 37. The mechanism 25 includes a female portion 50 which is screwed into a threaded port 52 and projects into a fluid stream in a fluid flow passage 54 in the engine 22 or in other fluid flow passages to be tested. As shown in FIG. 2, a dust cap 56 is locked to the female portion 50 and has a dummy connection on its other end that is connected to the associated cable 35 (FIG. 1) by a conventional rotatable coupling member 60 for storage and for keeping the internal portions of the coupling member 60 clean.

In FIG. 4, the pressure probe 36 is shown connected to the female portion 50 and is provided with a large transducer 62 (shown partially cut away) which may be connected to the coupling member 60 of the associated cable 35 by transducer prongs 64 and cooperating sockets 66 in the coupling member 60.

In FIG. 5 the temperature probe 37 is shown connected to the female portion 50 of the quick connect mechanism 25. The temperature probe 37 includes a smaller transducer 68 disposed within the cylindrical housing of the probe 37 which has a bimetal temperature sensing element, and compact electrical circuitry fitted within the body of the probe. The transducer 68 has prongs 70 projecting therefrom which are received within the socket 66 of the transducer cable coupling member 60. It will be understood that the transducer cable 35, the coupling member 60, and the socket 66 are usable with the pressure probe as well as the temperature probe.

More particularly, the female portion 50 (FIGS. 2-5) of the preferred embodiment of the quick connect mechanism 25 comprises a threaded tubular housing 76 adapted to be screwed into the port 52 leading into the fluid flow passage 54. A foot valve body 78 may be conveniently formed from a tubular rivet 80 having a plurality of flow passages 82 drilled therein and is slidably received within a sleeve 84 which includes an inturned end flange 86. An O-ring seal 88 is fitted on the body 78 between its head 90 and the flange 86, and a compression spring 92 is disposed between the flange 86 and a washer 93 that is secured to the body 78 by an outwardly flared portion of the body. The sleeve 84 of the resulting foot valve assembly is then press fitted into the housing 76 with the spring 92 normally urging the O-ring seal 88 into fluid sealing engagement with the flange 86 thereby defining a primary seal.

A latch 94 (FIGS. 2 and 3) is provided in the female portion 50 of the quick connect mechanism 25. The latch is slidably received in transverse slots 96 (FIG. 3) in the housing 76 of the female member 50. An angled slide member 98 has an elongated slot 100 therein which includes a large oval portion terminating in two progressively smaller portions. As best shown in FIG. 4, a compression spring 102 is seated in a transverse bore in the female portion 50, and engages an angled portion of the angle member 98. A longitudinal bore 106 in the housing 76 of the female member 50 receives a compression spring 108 and a cup shaped cylindrical plug 110 that has a relatively large diameter head 112 normally positioned externally of the bore 106, a small diameter portion 114 that is received in the small portion of the elongated slot 100, and a large diameter portion slidably received in the bore 106. In order to insert or remove the dust cap 56, the pressure probe 36, or the temperature probe 37, the slide member 98 is manually pushed inwardly against the urging of the spring 102 until the large portion of the slot 100 allows the cylindrical inner end portion of the dust cap or probes to be inserted or removed from the female portion 50. In the event the slide member 98 must be removed from the female portion 50 for repairs or the like, the slide member is pushed its full length against the urging of the spring 102, a pointed tool is then used to push the cylindrical plug 110 fully into the bore 106 so that the relatively large diameter head 112 passes through intermediate portions of the elongated slot 100 thus allowing the slide member 98 to be pulled free of the tubular housing 76.

The dust cap 56 includes a cylindrical portion 118 having a locking groove 120 for receiving a portion of the latch 94 therein, and having two additional grooves for receiving O-rings 122 and 124. When the cylindrical portion 118 is inserted in the female portion 50 as shown in FIG. 2, the O-ring 122 provides a secondary seal and the O-ring 124 provides a tertiary or third seal thus greatly minimizing any tendency for fluid leakage to occur past the dust cap. The dust cap 56 also includes a large diameter head 128 which is internally threaded to receive a threaded portion of a dummy electrical plug 130 to which the conventional wiring socket or coupling member 60 is secured. When the pressure probe 36 or the temperature probe 37 are being used during testing the dust cap is removed and the temperature and/or pressure probes are selectively connected thereto. Also, when the dust cap 56 is removed from the female portion 50 for testing, a flexible wire 132 is provided for retaining the dust cap 56 in the vicinity of the female portion 50 of the quick connect mechanism 25.

Although the wiring socket 60 and its manner of connection to the dust cap 56 is of conventional design, a brief description is deemed desirable for a full understanding of the invention. The associated cables 35 or 30′ (FIG. 1) are rigidly secured to a tubular metal sleeve 136 (FIG. 2) having linear ridges 138 on its outer surface which slidably engage cooperating linear valleys 140, such as that illustrated only in FIG. 4 of the pressure probe 36 but which are also present in the dust cap 56 and the temperature probe 37. Thus, the ridges and valleys prevent rotation of the sleeve 136 as the coupling member 60 is rotated relative to the dummy electrical plug 130 to connect or release the cable from the coupling member. The plug 130 has several radial projections 141 thereon which ride along helical grooves 142 in the coupling member 60 thereby moving from the disconnected position shown in FIG. 4 to its connected position shown in FIG. 2. It will be noted that a substantially frustoconical snap ring 144 (FIG. 4), which acts as a spring, is flattened when the coupling is connected to the dummy plug 130 as shown in FIG. 2.

Having reference to FIG. 4, it will be noted that the pressure probe 36 has a cylindrical portion 145 that is provided with an elongated end portion which enters the female portion 50 of the quick connect mechanism 25 and engages the inner flared portion of the body 80 of the foot valve 78 thereby opening the foot valve 78 a sufficient amount to allow fluid to flow through a passage 146 into the pressure transducer 62 which when the electrical coupling 60 is connected, sends a fluid pressure signal through the associated cable 35 (FIG. 1), the junction box 31 and the transducer cable 30 to the vehicle test meter 34. It will be noted that two O-ring seals 148,150 are fitted into grooves in the cylindrical portion 145 and provide a primary and secondary fluid seal before the foot valve 78 is opened by insertion of the pressure probe 36 into locking engagement with the female member 50.

The temperature probe 37 (FIG. 5) includes a large diameter portion 154 having grooves therein which receive O-rings 156,158 which provide primary and secondary seals against the internal surface of the female portion 50 of the quick connect mechanism 25 before a reduced diameter stem 160 engages the head 90 of the foot valve 78 and opens the same a suitable amount so that fluid flowing in the flow passage 54

(FIG. 2) will flow through the holes 82 in the foot valve 78 and circulate past the stem 160 thereby detecting the temperature of the fluid causing the transducer 68 to send a temperature signal through the associated cable 35 (FIG. 1) transducer cable 30 to the vehicle test meter 34 (FIG. 1), or through the transducer cable 30' directly to the meter 34. As shown in FIGS. 2, 4 and 5, the grooves for the O-rings are formed in the cylindrical male portions of the dust cap 56, pressure probe 36 and temperature probe 37. This is the preferred location for the O-ring since a single pressure and a single temperature probe are preferably used with a plurality of female portions 50 of the quick connect mechanisms 25 resulting in fewer O-rings and machined grooves as compared to O-rings which are mounted in grooves formed in the female portions 50 of each mechanism 25. It will be understood, however, that it is within the scope of the invention to provide O-rings on the female portions 50 of the quick connect mechanisms if desired.

During operation of the quick connect diagnostic system of the present invention in its preferred mode as illustrated in FIG. 1, the female portions 50 of a plurality of the quick connect mechanisms 25, such as the seven mechanisms 25J–25P shown in FIG. 1, are permanently screwed into ports in the engine 22 and communicate with fluid flow passages therein. The engine may be mounted in a vehicle or the engine may be removed from the vehicle and mounted on a test stand. During normal operation of the engine 22, the dust caps 56 (FIG. 2) are connected to the female portions 50 and to the associated cables 35. The dust caps 56 function to provide secondary and tertiary seals and also provide dummy connections for the cables 35 for keeping the cable couplings clean and for preventing free movement of the cables 35. The dust caps 56 are connected to the female portions of the several quick connect mechanisms 25 for more than 99 percent of the time the engine 22 is operating. Accordingly, the transducers 62 and 68 are not subjected to the detrimental vibration and cyclic temperature extremes inherent in diesel engines that would occur if they were permanently mounted on the engine, especially when used in a military vehicle moving over rough ground.

When it is desired to test the fluid pressures and/or temperatures in the engine, no liquid passages need be drained. When the operator desires to check pressures in the fluid streams, he merely shifts the latch 94 (FIG. 2) of one of the quick connect mechanisms, for example mechanism 25J (FIG. 1), against the urging of the spring 102 and then pulls the dust cap 56 out of the female portion 50 and inserts the pressure probe 36 therein and latches the probe in place in the groove by releasing the latch 94 as shown in FIG. 4. The associated cable 35 is then connected to the pressure probe 36 FIG. 4) and to the vehicle test meter 34 through the junction box 31 (FIG. 1) and the transducer cable 30. The engine is then started, if not already running, and the operator reads the pressure reading from the meter 34. The operator then disconnects the pressure probe 36 from the female portion 50 of quick connect mechanism 25J, and reinserts the dust cap 56 into the mechanism 25J. Thereafter the operator inserts the pressure probe into the female portion 50 of another quick connect mechanism where pressure readings are desired, after first removing its dust cap. The associated cable 35 is then attached to the probe 36 and a second pressure reading is taken. The above procedure is sequentially repeated for each quick connect mechanism 25, in turn, at which pressure readings are desired.

The same procedure is followed when testing the several fluid flow streams in the engine for temperature readings. In this regard the temperature probe 37 is sequentially inserted in the female portions of the several quick connect mechanisms, for example, in mechanisms 25K, 25M, and 25P (FIG. 1), at which temperature readings are desired. Preferably, a single temperature probe 37 is sequentially used at each quick connect mechanism location at which temperature requirements are to be taken during the diagnostic testing of the engine.

Figure 6:
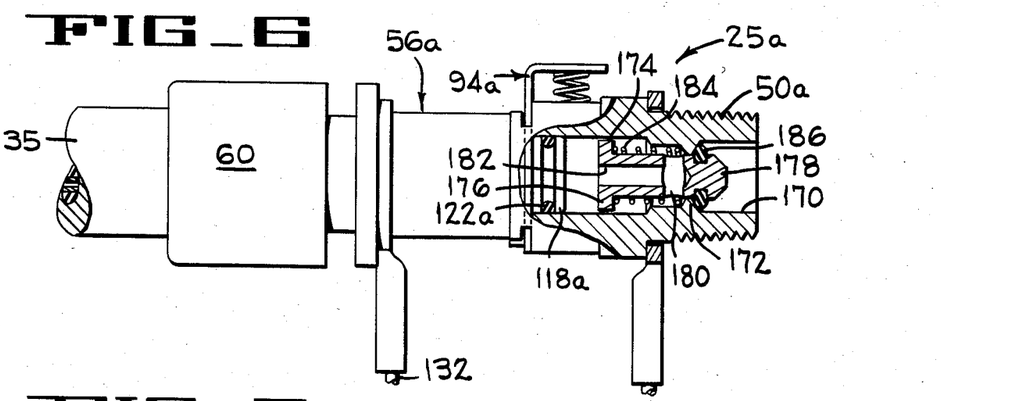
FIG. 6 is an elevation with parts cut away of a second embodiment of the quick connect mechanism with the female portion thereof cut away illustrating a different type of foot valve in closed position and having a dust cap with electrical leads connected thereto.
Figure 7:
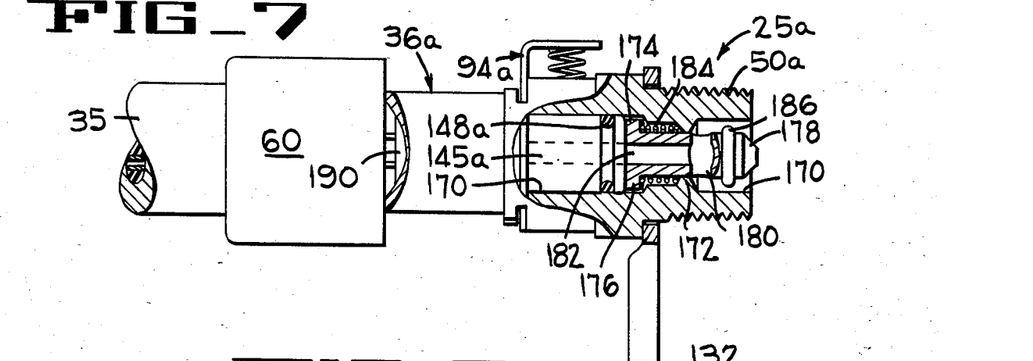
FIG. 7 is an elevation similar to FIG. 6 with the foot valve opened by a pressure probe having a small pressure probe transducer therein with an electrical cable connected thereto.

FIGS. 6 and 7 illustrate a second embodiment of a quick connect mechanism 25a which is similar to the first embodiment 25 except that the mechanism 25a is limited to use with a dust cap 56a and a pressure probe 36a. Accordingly, only the differences of the second embodiment relative to the first embodiment will be described in detail, and equivalent parts will be assigned the same numerals followed by the letter (a).

The quick connect mechanism 25a includes the dust cap 56a which is connected to the associated electrical cable 35 by the coupling member 60. The dust cap 56a differs from that of the first embodiment only in that the cylindrical portion 118a is shorter and is grooved to receive only the latch 94a and one O-ring 122a. The female portion 50a of the quick connect mechanism 25a differs from that of the first embodiment in that the longitudinal bore 170 therein is of varying diameter which includes a minimum diameter portion that acts as a valve seat 172 and a spring support. A generally T-shaped foot valve 174 is slidably received in the bore 170 and includes a large diameter end portion 176 and a small diameter stem 178 having a cross passage 180 extending therethrough and communicating with an axial passage 182 that extends through the large diameter portion 176 of the foot valve 174. A helical compression spring 184 is disposed between the valve seat 172 and the large diameter portion 176 of the valve 174. An O-ring 186 is fitted in a groove in the stem 178 and is urged into sealing engagement with the valve seat 172 by the spring 184 as shown in FIG. 6.

An enhanced totally new trouble shooting diagnostic capability is taught by the preferred embodiment of this invention. Since the female portions 50 (FIGS. 2, 4 and 5) of all quick connect couplings will receive both pressure and temperature probes, i.e., those positions normally chosen for pressure sensing in the old art can now be used also for temperature sensing as disclosed in the present invention, and vice-versa. Trouble shooting diagnosis is therefore enhanced factorially by being able to sense both pressure and temperature at a given quick connect location.

For example, a single abnormally high temperature indication in the coolant loop at 25L (FIG. 1) might suggest only that there is an insufficient flow volume, and therefore provides only a speculative analysis for several possible deficiencies: (1) The circulating pump may have damaged blades or vanes, or (2) The impeller to case clearances may have become excessive, or (3) There may be an obstruction somewhere in the circulating loop (kinked hose or internal solids), or (4) There may actually be a sufficient flow volume, but poor dissipation of heat via radiator core tubes, or (5) There may be an improper or excessive heat transfer in transmission oil cooling exchanger, or (6) The thermostat may be opening improperly, or a host of other possible deficiencies. A single temperature sensing via 25L cannot eliminate any of these suspect deficiencies. One obviously does not want to remove the engine and/or transmission for exploratory purposes if the deficiency is a kinked radiator discharge hose, nor does one want to remove a suspect water pump if the deficiency is the radiator.

The present invention teaches that one can now choose an almost infinite variety of further diagnostic testing choices. For example, if a slightly abnormally high oil temperature is indicated at 25K in addition to previously supposed abnormally high coolant temperature at 25L, one can conclude the transmission oil is slightly overheated because the aforementioned coolant (25L) is also overheated. Therefore, there is nothing internally wrong with this oil coolant heat exchanger. If the opposite were true, (oil temperature at 25K was abnormally high) one can choose to insert a pressure transducer in the normal 25K temperature port, as newly taught by this invention. If this newly acquired oil pressure indication is low, the flow of oil is also low, and one looks for oil flow obstruction within the exchanger only if oil pressure at 25J is normal and newly acquired temperature sensing at 25J is not abnormally high. Conversely, if newly acquired oil temperature sensing via 25J indicates abnormally high, one concludes the transmission is overheating, and subsequently overheating coolant via the exchanger. Further diagnosis in this instance might identify defective internal clutches via temperature and/or pressure sensing via ports 28. However, if we have actually diagnosed no transmission overheating and no heat exchange obstruction, one can now obtain a newly acquired pressure reading from the normal coolant temperature sensing port 25L. An abnormally high pressure indication here still confirms a flow obstruction, but it indicates a properly operating coolant pump. (No broken blade—clearances are correct). Suspect deficiencies now, via the present invention, is reduced to a kinked hose, internal solids plugging, or insufficient heat dissipation via radiator. It is assumed that the thermostat is upstream from 25L and therefore suspected malfunction of same has been eliminated by the newly acquired high pressure indication at 25L.

Further diagnostic analysis via FIG. 1 suggests one cannot now isolate further unless new ports at radiator inlet and outlet are made available for pressure and/or temperature sensing as taught by this invention. However, this example of a diagnostic exercise, proves that the ability to sense either temperature or pressure at quick connect ports, greatly enhances the diagnostic analysis process. This enhanced capability is a factorial increase of sensing locations and subsequent diagnosis.

Having reference to FIG. 7, the pressure probe 36a is connected to the associated cable 35 by the coupling 60 and has its cylindrical portion 145a inserted into the bore 170 a sufficient distance to engage and open the foot valve 174 and is locked in place by the latch 94a as clearly shown in FIG. 7. A single O-ring 148a seals the passage 170a prior to opening the foot valve 174. A small transducer 190 rather than the preferred large transducer 62 of the pressure probe 36 (FIG. 4) of the preferred embodiment is positioned within the tubular body of the pressure probe 36a and permits the probe to be used in confined areas.

The quick connect mechanism 25a of the second embodiment is intended for use when checking pressure, and may be used at locations 25J, 25M, 25N and 25O of FIG. 1 in place of the pressure probe 36 of the first embodiment of the invention. The quick connect mechanism 25a is provided with a single seal 148a (FIG. 7) when testing pressure, and two seals 186,122a when the dust cap 56a is connected thereto. Thus, the quick connect mechanism 25a of the second embodiment provides one less fluid seal than that of the first embodiment in both its testing and non-testing modes.

Figure 8:
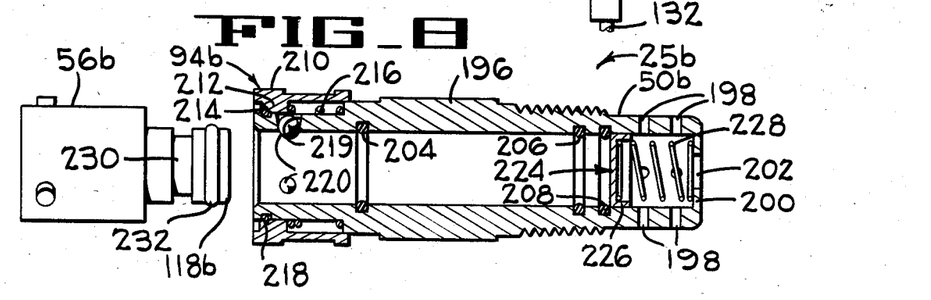
FIG. 8 is a central section of a third embodiment of a quick connect mechanism having a poppet type foot valve illustrated in closed position and a dust cover shown in elevation ready to be inserted into the quick connect mechanism.
Figure 9:
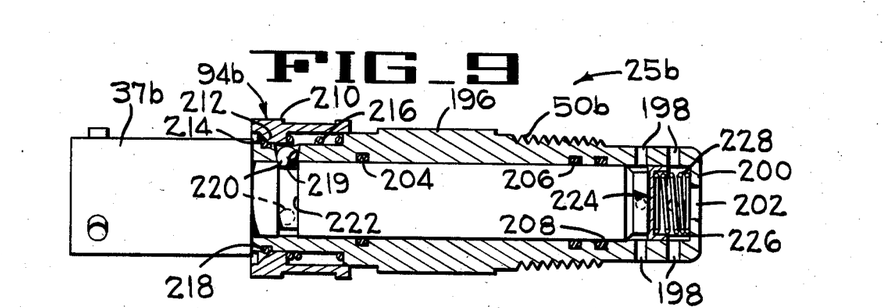
FIG. 9 is a view similar to FIG. 8 but with a temperature probe locked into the quick connect mechanism and engaging the poppet valve to open the same, a small temperature transducer being included within the housing of the temperature probe.

A third embodiment of the quick connect mechanism 25b of the present invention is illustrated in FIGS. 8 and 9 and is usable to detect the temperature of fluids in a flow passage.

The female portion 50b of the mechanism 25b comprises a tubular housing 196 having radial flow passages 198 near its inner end and a partially closed inner end wall 200 having a port 202 therein. The external surface of the tubular housing 196 is threaded for connection to the port of a fluid flow passage such as the passage 54 (FIG. 2). Three O-rings 204,206 and 208 are fitted in grooves within the tubular housing 196. A ball type latch 94b is provided on the outer end of the tubular housing 196 and includes a locking ring 210 slidably received on the outer surface of the housing 196. The ring 210 includes an inwardly projecting flange 212 having an inner spring engaging surface and an outer generally frusto-conical ball receiving recess 214. A compression spring 216 is disposed between a transverse surface of the flange 212 and a companion flange in the outer surface of the housing 196. The spring 216 urges the ring 210 toward the outer end of the housing 196, and a snap ring 218 is fitted in a groove in the housing to limit the outward movement of the latch ring 210. A plurality of frusto-conical holes 219 are drilled in the housing 196 adjacent the flange 212 and receive retaining balls 220 therein which project into the bore in the housing when the locking ring 210 is positioned as shown in FIG. 9 at which time the flange 212 holds the balls 220 within a retaining groove 222 in the temperature probe 37b.

As best shown in FIG. 8, a foot valve 224 is provided within the inner end of the tubular housing 196. The foot valve 224 is of the poppet type and includes an inverted cup 226 which is normally urged into sealing engagement against the O-ring 208 by a compression spring 228 disposed between the cup 226 and the end wall 200.

In order to insert the dust cap 56b into the female portion 50b of the quick connect mechanism 25b, or remove the dust cap therefrom, an operator must first move the ring 210 toward the right (FIG. 8) against the urging of the spring 216 until the frustoconical groove 214 is positioned around the balls 220. The dust cap 56b may then be pushed into the female member 50b and is locked in place with the balls 220 entering a locking groove 230 in the tubular portion 118b of the dust cap 56b. The tubular portion 118b of the dust cap is also grooved to receive an O-ring 232 which cooperates with the O-ring 208 to provide a primary and secondary fluid seal when the dust cap 56b is locked in the female portion of the quick connect mechanism 25b.

As illustrated in FIG. 9, when the temperature probe 37b is locked in the female member 50b, the inner end of the probe 37b contacts and opens the foot valve 224 thereby allowing the fluid to flow through passages 198 and around the inner end of the probe 37b causing a small transducer (not shown but similar to the transducer 68—FIG. 5) to send a signal to the vehicle test meter 34 (FIG. 1) when connected thereto by the cables 35 and 30. It will also be noted that the three O-ring seals 204, 206 and 208 prevent leakage past the temperature probe 37b during testing.

Figure 10:
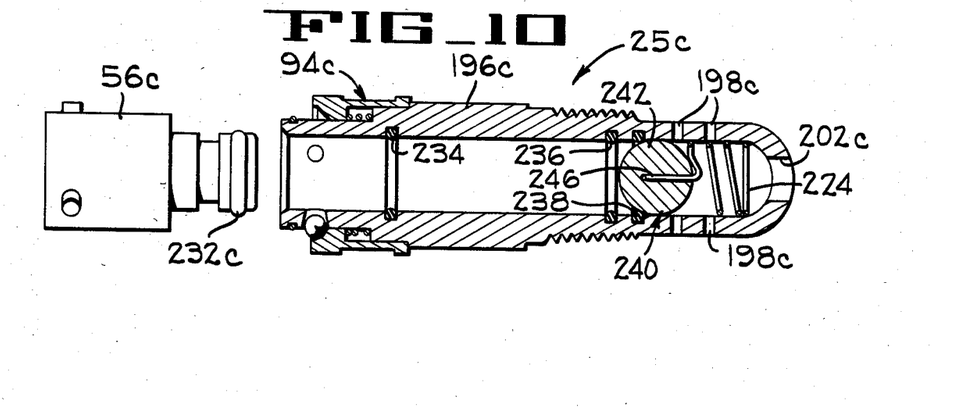
FIG. 10 is a central section of a fourth embodiment of the quick connect mechanism illustrating a ball type foot valve in a closed position and a dust cap disposed in position to be inserted into the female portion of the mechanism.
Figure 11:
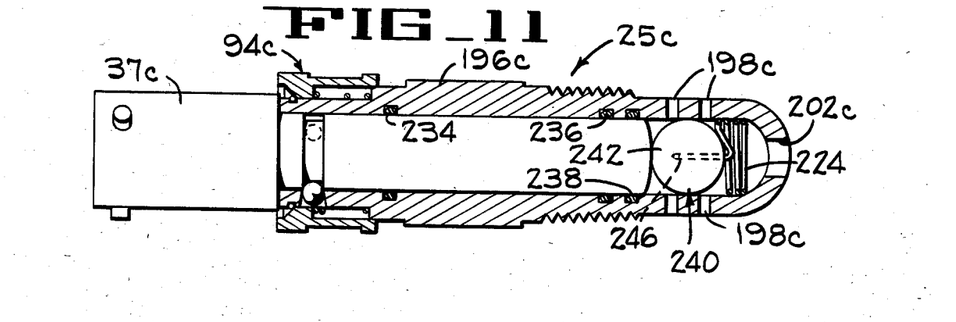
FIG. 11 is a view similar to FIG. 10 but with a temperature probe inserted therein opening the ball valve, a small temperature transducer being included within the housing of the temperature probe.

A fourth embodiment of the quick connect mechanism 25c is illustrated in FIGS. 10 and 11. The fourth embodiment is quite similar to the third embodiment and accordingly only the differences will be described in detail. Parts of the fourth embodiment which are similar to the first or third embodiments will be assigned the same numerals followed by the letter (c).

The quick connect mechanism 25c includes a generally tubular housing 196c having a rounded inner end portion with fluid access ports 198c and an end port 202c therein. A dust cap 56c (FIG. 10) or a temperature probe 37c are selectively locked in the quick connect mecnanism 25c by a ball type retaining latch 94c. Three O-rings 234, 236 and 238 are fitted in grooves machined into the internal surface of the tubular housing 196c rather than in the external surface of the temperature probe as in the preferred embodiment of the invention.

A ball type foot valve 240 is provided in the tubular housing 196c and includes a ball 242 which is normally urged into sealing engagement with the O-ring 238 by a compression spring 224 disposed between the ball and the inner end of the housing. The ball 242 is drilled to receive a linear end portion 246 of the spring to prevent the ball from rolling. Thus, the ball presents the same sealing surface against the O-ring 238 at all times when sealed.

It will be noted that when the dust cover 56c is locked within the tubular member 196c, O-ring seals 232c and 238 cooperate to prevent leakage past the quick connect mechanism 25c. When the temperature probe 37c is locked in the tubular member 196c, the three O-rings 234, 236 and 238 prevent leakage out of the quick connect mechanism 25c. A small transducer (not shown) but similar to that shown in FIG. 5 is provided in the temperature probe 37c.

Figure 12:
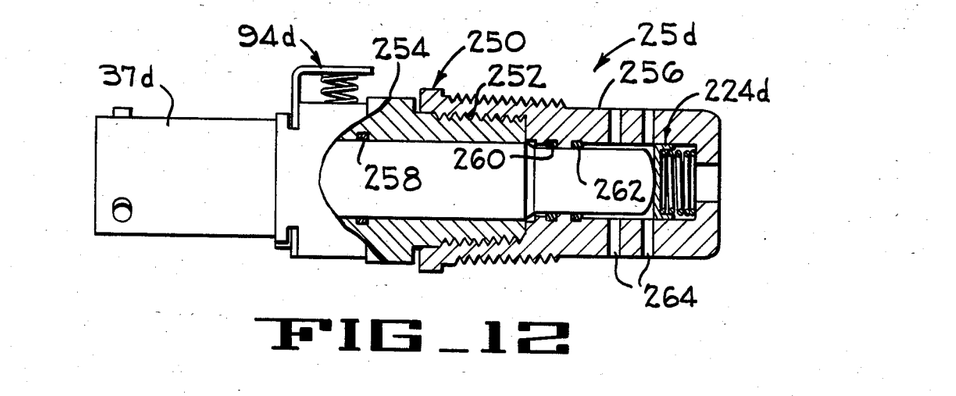
FIG. 12 is an elevation with parts cut away illustrating a fifth embodiment of the quick connect mechanism with a temperature probe therein opening a poppet type valve, a small transducer being included within the housing of the temperature probe.

A fifth embodiment of the quick connect mechanism 25d is illustrated in FIG. 12 with a temperature probe 37d locked therein by a latch 94d of the type illustrated in FIG. 2. A two section tubular body 250 is connected together by screw threads 252 and includes a locking section 254 and a foot valve section 256 having a poppet type foot valve 224d therein that is similar to the valve 224 illustrated in FIGS. 8 and 9. As shown in FIG. 12, a single O-ring 258 is fitted within a groove in the locking section 254; and two O-rings 260, 262 are fitted within grooves in the foot valve section 256 with the O-ring 262 engaging the foot valve 224d to provide a primary seal when the temperature probe 37d is removed from the quick connect mechanism 25d. When the temperature probe 37d is locked in place as shown in FIG. 12, and when the quick connect mechanism 25d is screwed in a port communicating with a fluid flow passage such as the passage 54 shown in FIG. 2, fluid flows through ports 264 past the inner end of the temperature probe 37d to actuate a small transducer (not shown) within the probe which sends a signal to the vehicle test meter 34 (FIG. 1) when connected thereto by the associated cable 35, the junction box 31 and the transducer cable 30.

Figure 13:
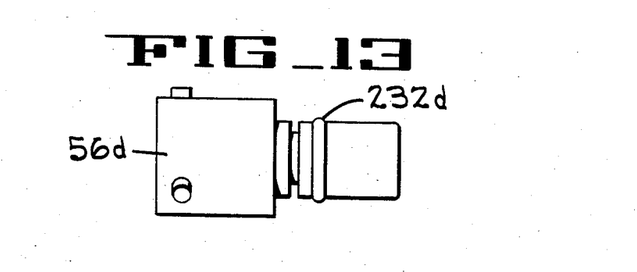
FIG. 13 is an elevation of a dust cap for use in the mechanism of FIG. 12.

When the temperature probe 37d is locked within the quick connect mechanism 25d as shown in FIG. 12, the three O-ring seals 258, 260 and 262 prevent fluid leakage; when the dust cap 56d of FIG. 13 is locked within the female portion 250 of the quick connect mechanism 25d, O-ring seals 232d, 258 and 262 cooperate to prevent leakage therepast.

From the foregoing description it is apparent that the quick connect diagnostic system of the present invention is primarily intended for detecting the pressure and/or temperature of fluids in flow passages in diesel or gasoline engines. The system includes a plurality of quick connect mechanisms each having a female portion with a foot valve therein connected to a flow passage in the engine or in accessories attached to the engine. Each female portion includes a foot valve which prevents fluid from flowing out of said female portion wnen the engine is running during normal operation. During normal operation dust caps are inserted in associated female portions and prevent dust and debris from entering the portions as well as providing at least one additional fluid seal which cooperates with the associated foot valve to prevent leakage of fluid out of the quick connect mechanism. The several dust caps also serve as sockets upon which the loose ends of associated ones of a plurality of individual quick connect cables are stored when not being used during diagnostic testing of the engine.

When the engine is to be tested, which occurs less than one percent of the time the engine is running, the dust caps are removed and a single pressure probe is sequentially inserted into each of the female portions of the quick connect mechanism to open the foot valves therein, thus transmitting individual pressure signals to the pressure probe transducer, which signals are independently transmitted to a test meter to provide pressure read outs to the operator. The temperature in the several flow passages which are to be tested are similarly tested except a single temperature probe is sequentially inserted in associated female portions of the quick connect mechanisms. The probes may be connected to a test meter by a single transducer cable connected between the test meter and a junction box, and a plurality of individual cables connected between the junction box and the several quick connect mechanisms. A single pressure probe and a single temperature probe may be sequentially connected to the several female portions of the quick connect mechanism; or alternatively, separate temperature and pressure probes may be connected to associated ones of the female portions and to the individual cables which are selectively connected to the test meter by switch means. An additional method of operating the diagnostic system is to bypass the junction box and use a single transducer cable connected the test meter, and to a single pressure probe which is sequentially inserted into its female portion of the quick connect mechanisms that communicate with fluid passages to be checked for pressure. The temperature passages are similarly tested using a single transducer cable.

The specific features of the several embodiments to the quick connect mechanism considered as an article of manufacture are useful in other combinations; with the first embodiment being a universal system capable of receiving either a pressure probe or a temperature probe.

Although the best mode contemplated for carrying out the present invention has been herein shown and described, it will be apparent that modification and variation may be made without departing from what is regarded to be the subject matter of the invention.

What is claimed is:

1. A quick connect diagnostic system comprising:

means defining a fluid flow passage with a fluid stream flowing therethrough;

means defining a first portion of a quick connect mechanism having a normally closed valve therein secured to said flow passage means in communication with the fluid stream and movable between said closed position and an open position permitting fluid to flow therepast;

means defining a second portion of the quick connect mechanism which includes a probe for opening said foot valve when coupled with said first portion, said first and second portions including at least one seal member therein which seals the first and second portions together prior to opening said foot valve;

means defining a quick connect latch for releasably latching said first and second portions together when coupled together;

a transducer connected to said probe detecting a signal indicative of a characteristic of said fluid in said flow passage; and meter means coupled to said transducer for providing a reading indicative of the fluid characteristics being tested, said probe being a temperature probe which enters the stream of fluid in said fluid flow passage for determining the temperature of the fluid.

2. A quick connect diagnostic system for determining temperature and pressure of fluids flowing in flow passages in an engine and in accessories of the engine, comprising:

means defining female portions of a plurality of quick connect mechanisms secured to selected ones of said flow passages in communication with the fluid therein;

means defining a normally closed foot valve in each female portion for preventing flow of fluid therefrom, said foot valve means being movable between said closed position and an open position permitting fluid to flow therepast;

means defining a sealing surface in each female portion;

means defining at least one sensing probe for opening an associated foot valve when fully inserted into an associated female portion, means defining at least one fluid seal between the female portion and the sensing probe before said probe opens an associated foot valve, and quick connect latch means for releasably locking said probe into the associated female portion;

a transducer connected to said probe for detecting a signal indicative of characteristics of the fluid in the associated flow passage; and meter means coupled to said transducer for providing readings indicative of the fluid being tested by said probe and transducer;

said at least one sensing probe being a temperature probe which opens said foot valve a sufficient amount to project the end of the probe into the fluid flowing in the associated passage to provide an accurate temperature reading.

3. A quick connect diagnostic system for determining the temperature and pressure of fluids flowing in flow passages in an engine and in accessories of the engine, comprising;

means defining female portions of a plurality of quick connect mechanisms secured to selected ones of said flow passages in communication with the fluid therein;

means defining a normally closed foot valve in each female portion for preventing flow of fluid therefrom, said foot valve means being movable between said closed position and an open position permitting fluid to flow therepast;

means defining a sealing surface in each female portion;

means defining at least one sensing probe for opening an associated foot valve when fully inserted into an associated female portion, means defining at least one fluid seal between the female portion and the sensing probe before said probe opens an associated foot valve, and quick connect latch means for releasably locking said probe into the associated female portion;

a transducer connected to said probe for detecting a signal indicative of characteristics of the fluid in the associated flow passage;

meter means coupled to said transducer for providing readings indicative of the fluid being tested by said probe and transducer; and a plurality of dust caps each having a cylindrical portion, each cylindrical portion being inserted within an associated female portion and being latched in place by said latch means when the associated probe is absent from said female member and at least one O-ring seal on said cylindrical portion of said dust cap for providing a secondary seal with said female portion which cooperates with said foot valve when the dust cap is locked in the associated female portion for preventing fluid leakage therepast.

4. A quick connect diagnostic system for testing the temperature and pressure of flowing fluids in flow passages in an engine during a small proportion of the time the engine is operating, and for removing much of the diagnostic system during normal operation of the engine which occurs during a large proportion of the time the engine is operating:

when operating the engine under normal conditions said system comprising:

means defining female portions of a plurality of quick connect mechanisms secured to selected ones of said flow passages in communication with the fluid therein;

means defining a normally closed foot valve in each female portion for normally preventing flow of fluid therefrom, said foot valve being movable between said closed position and an open position permitting fluid to flow therepast;

means defining a dust cap for each female portion of said quick connect mechanism, each dust cap including a cylindrical portion having at least one fluid seal thereon for insertion in said female portion to cooperate with said foot valve to provide a secondary seal for preventing fluid leakage out of said quick connect mechanism during normal operation of the engine;

when operating the engine under test conditions said dust cap being removed from said female portion and said system additionally comprising:

means comprising at least one sensing probe for opening an associated foot valve when fully inserted into an associated female portion, means defining at least one fluid seal between the female portion and the sensing probe before said probe opens said associatee foot valve;

and quick connect latch means for selectively and releasably locking each said dust cap or said at least one probe into the associated female portion;

a transducer connected to said at least one probe for detecting a signal indicative of the temperature or pressure of the fluid in the associated flow passage; and meter means coupled to said transducer for providing a reading indicative of the fluid being tested by said at least one probe and transducer.

5. A system according to claim 4 wherein said fluid seals are a plurality of O-rings fitted within grooves in the cylindrical portion of the dust cap and O-rings fitted within grooves in the probe.

6. A system according to claim 4 wherein the fluid seals between said female portion of the quick connect mechanism and said probe and dust cap are O-rings fitted within the grooves in said female portion.

7. A quick connect diagnostic method for testing the temperature and pressure of flowing fluids in flow passages in an internal combustion engine having female portions of quick connect mechanisms with foot valves therein connected to and communicating with different ones of said flow passages, and having male portions of dust caps, and temperature or pressure probes selectively connected to said female portions, the temperature and pressure indicia being determined by transducers on the probes which are connected to a test meter:

when the engine is in normal operation, said method comprising the steps of:

inserting the male portions of said dust caps into the female portions of the associated quick connect mechanisms, latching the dust caps to said female portions, providing at least one fluid seal between said dust caps and female portions to cooperate with said foot valves to preclude leakage through said quick connect mechanism;

when a selected one of said fluid stream is to be tested for temperature, said method additionally comprising the steps of:

removing a dust cap from the female portion that is communicating with said selected fluid stream;

inserting a temperature probe into said female portion that communicates with the selected one of said flow passages with a portion of the probe entering the flowing fluid;

latching said temperature probe to said female portion; and connecting the transducer of the selected temperature probe to the meter for providing a reading of the temperature of the fluid in said selected fluid stream being checked for temperature.

8. A method according to claim 7 and when a selected one of said fluid streams is to be tested for pressure, the method additionally comprising the steps of:

removing a dust cap from the female portion connected to the selected fluid stream to be tested for pressure;

inserting a pressure probe into said female portion; and connecting the transducer of the selected pressure probe to the meter for providing a reading of the pressure of the fluid in said selected fluid stream being checked for pressure.

9. A method according to claim 7 wherein when all of said fluid streams required to be tested for temperature are to be tested, said method additionally comprising the steps of:

sequentially removing the dust caps from all of said female portions communicating with fluid streams to be tested for temperature;

sequentially inserting a single temperature probe into each of said female portions selected for testing temperature for first opening the associated foot valve and thereafter projecting a portion of the temperature probe into the fluid;

connecting the transducer of said single temperature probe to said meter for sequentially providing temperature readings of the fluid in each of said fluid streams being checked for temperature;

sequentially removing said single temperature probe from each of said female portions selected for testing temperature; and sequentially reinserting said dust caps on said female portions after said temperature probe has been removed for maintaining said female portion clean and for providing a secondary seal.

10. A method according to claim 7 wherein when all of said fluid streams required to be tested for pressure are to be tested, said method additionally comprising the steps of:

sequentially removing the dust caps from all of said female portions communicating with fluid streams to be tested for pressure;

sequentially inserting a single pressure probe into each of said female portions selected for testing pressure for first opening the associated foot valves and thereafter subjecting the pressure probe to the pressure of said fluid;

connecting the transducers of said single pressure probe to said meter for sequentially providing pressure readings of the fluid in each of said fluid streams being checked for pressure;

sequentially removing said single pressure probe from each of said female portions selected for testing pressure; and sequentially reinserting said dust caps on said female portions after said pressure probe has been removed for maintaining said female portions clean and for providing a secondary fluid seal.

11. A quick connect mechanism comprising;

a tubular female member adapted to be connected to a fluid flow passage having fluid under pressure therein;

a foot valve in said member;

resilient means for normally urging said foot valve into a closed position;

a probe having a cylindrical portion adapted to be inserted into and removed from said tubular female member, said cylindrical portion when fully inserted in said female tubular member contacting and opening the foot valve for permitting fluid to flow therepast;

means defining a fluid seal between said female tubular member and said cylindrical portion prior to opening said foot valve in response to insertion of said cylindrical member into said tubular female member;

quick connect latch means operatively connected to said female member and said cylindrical portion for releasably locking said cylindrical portion in position to open said foot valve; and a transducer operatively connected to said probe for detecting characteristics of the fluid acting on said probe when said female member is connected to said fluid flow passage and said cylindrical portion is locked within said female member and opens said foot valve;

said foot valve comprising a tubular portion having radial ports therein, a head on said tubular portion of said foot valve of larger diameter than said tubular foot valve portion, a seal ring disposed between said head and a stationary sealing surface of said female member, and helical spring means for normally urging said ring into sealing engagement between said head and said sealing surface, said probe being a temperature probe and said cylindrical portion of said temperature probe entering said tubular portion of said foot valve to open said foot valve with a portion of said probe being in direct communication with the fluid in said flow passage through said radial ports.

12. A quick connect mechanism comprising;

a tubular female member adapted to be connected to a fluid flow passage having fluid under pressure therein;

a foot valve in said female member;

resilient means for normally urging said foot valve into a closed position;

a probe having a cylindrical portion adapted to be inserted into and removed from said tubular female member, said cylindrical portion when fully inserted in said tubular female member contacting and opening said foot valve for permitting fluid to flow therepast;

means defining a fluid seal between said tubular female member and said cylindrical portion prior to opening said foot valve in response to insertion of said cylindrical member into said tubular female member;

quick connect latch means operatively connected to said female member and said cylindrical portion for releasably locking said cylindrical portion in position to open said foot valve; and a transducer operatively connected to said probe for detecting characteristics of the fluid acting on said probe when said female member is connected to said fluid flow passage and said cylindrical portion is locked in said female member and opens said foot valve;

said tubular female member including a ported end wall and a plurality of radial passages in said tubular female member adjacent said end wall, and wherein said fluid seal means comprises a plurality of O-ring seals supported in said tubular member, said foot valve comprising a ball having the hole means extending partially therethrough, and spring means disposed between said end wall and said ball for urging said ball into sealing engagement with one of said O-rings, said spring including a linear end portion received within said hole means for maintaining the same sealing surface against said one O-ring at all times when said foot valve is closed.

13. An apparatus according to claim 12 wherein said probe is a temperature probe and wherein full insertion of the cylindrical portion of the temperature probe moves said ball away from said one O-ring seal, said one O-ring seal and two additional O-ring seals being effective to seal said probe to said female member.

* * * * *